US012634375B1

(12) United States Patent
Wu et al.

(10) Patent No.: US 12,634,375 B1
(45) Date of Patent: May 19, 2026

(54) REDUNDANT BACKUP DEPLOYMENT METHOD FOR MICROSERVICE INSTANCES IN EDGE COMPUTING ENVIRONMENTS

(71) Applicant: Nanjing University of Aeronautics and Astronautics, Jiangsu (CN)

(72) Inventors: Qiang Wu, Jiangsu (CN); Chenghao Li, Jiangsu (CN); Guanchen Wu, Jiangsu (CN); Ran Wang, Jiangsu (CN)

(73) Assignee: Nanjing University of Aeronautics and Astronautics, Jiangsu (CN)

( * ) Notice: Subject to any disclaimer, the term of this patent is extended or adjusted under 35 U.S.C. 154(b) by 0 days.

(21) Appl. No.: 19/224,904

(22) Filed: Jun. 2, 2025

(30) Foreign Application Priority Data

May 20, 2025 (CN) .......................... 202510647668.3

(51) Int. Cl.
*H04L 67/51* (2022.01)

(52) U.S. Cl.
CPC .................................... *H04L 67/51* (2022.05)

(58) Field of Classification Search
CPC ...................................................... H04L 67/51
See application file for complete search history.

(56) References Cited

U.S. PATENT DOCUMENTS

| | | | | |
|---|---|---|---|---|
| 10,924,367 | B2 * | 2/2021 | Sinha | .................... H04L 43/045 |
| 11,561,802 | B2 * | 1/2023 | Mansour | ............. G06F 11/1415 |

| | | | | |
|---|---|---|---|---|
| 2021/0126840 | A1 * | 4/2021 | Venkataramu | ...... H04L 61/4511 |
| 2024/0176674 | A1 * | 5/2024 | Khanna | ................. G06F 9/5077 |
| 2024/0241707 | A1 * | 7/2024 | Tiwari | ................... G06N 20/00 |
| 2024/0283708 | A1 * | 8/2024 | Richter | ................... H04L 41/16 |
| 2024/0284153 | A1 * | 8/2024 | Milheiro Mendes | . H04W 72/21 |

FOREIGN PATENT DOCUMENTS

| | | |
|---|---|---|
| CN | 111083743 | 4/2020 |
| CN | 117255126 | 12/2023 |
| CN | 118118325 | 5/2024 |
| CN | 118337640 | 7/2024 |
| WO | 2022139879 | 6/2022 |

* cited by examiner

*Primary Examiner* — Jerry B Dennison
(74) *Attorney, Agent, or Firm* — JC ONE WORLD

(57) ABSTRACT

The present disclosure discloses a redundant backup deployment method for microservice instances in edge computing environments. Redundant backup deployment of the microservice instances and the selection of a primary instance are acquired using Transformer-based deep reinforcement learning (T-DRL). For a service failing to satisfy the service level agreement (SLA), the actual service reliability is improved by downgrading the switching priority of the microservice instances; for a service satisfying the SLA, the deployment cost of the microservice instances is reduced using a pruning algorithm. The present disclosure effectively reduces the deployment cost of microservice instances and minimizes the number of active edge nodes while ensuring the SLA, thereby effectively reducing the resource consumption in edge computing environments.

4 Claims, 3 Drawing Sheets

REDUNDANT BACKUP DEPLOYMENT METHOD FOR MICROSERVICE INSTANCES IN EDGE COMPUTING ENVIRONMENTS

CROSS-REFERENCE TO RELATED APPLICATION

This application claims the priority benefit of China application serial no. 202510647668.3, filed on May 20, 2025. The entirety of the above-mentioned patent application is hereby incorporated by reference herein and made a part of this specification.

TECHNICAL FIELD

The present disclosure relates to the technical field of microservice deployment in edge computing environments, and in particular, to a redundant backup deployment method for microservice instances, designed for edge computing environments and using Transformer-based deep reinforcement learning (T-DRL).

BACKGROUND

In recent years, cloud computing has been widely used for big data processing. Users only need to upload data to the cloud and utilize the ultra-efficient computing platform of cloud computing centers to centrally process computing requests. However, an increasing number of terminals are being connected via networks. If all data is uploaded to the cloud computing platform for processing, the cloud computing platform will face issues such as high network latency, congestion, and reduced reliability. With the rapid rise of emerging mobile services such as autonomous driving and drone inspection, ultra-low latency and ultra-high reliability have gradually become indispensable key technical requirements in these service scenarios.

To address the real-time requirements of latency-sensitive services that cloud computing cannot fulfill, mobile edge computing (MEC) has emerged. As a distributed computing architecture that deploys computing resources within the access network and moves the computing capability of the cloud data center to edge nodes close to user terminals, MEC has become a crucial solution for handling massive data processing demands in modern networks. MEC significantly reduces the occupation of core network resources, lowers data transmission latency, and improves system reliability and user experience by processing data and providing services at edge nodes close to users. As a result, MEC has demonstrated significant advantages in application scenarios with higher requirements for latency and reliability.

Meanwhile, with the continuous development of network technologies, Internet applications and network scales are experiencing explosive growth. Conventional dedicated hardware requires a large number of dedicated devices to provide user-requested services, and consequently, the microservice architecture is gradually replacing the monolithic application architecture. In a conventional network architecture, most network functions rely on dedicated hardware devices. All function modules are integrated into one application, and the entire application is deployed as a single deployment unit. Therefore, to ensure service reliability, a large number of expensive, high-performance dedicated devices are typically required. Driven by virtualization technology, microservice architectures are extensively used, separating each monolithic application into a plurality of independent microservices. Benefiting from the loosely coupled architecture, microservices can be deployed flexibly and elastically on commercial servers. Even if a certain microservice fails, other microservices can still operate normally, thereby improving service reliability and reducing the high costs associated with dedicated devices.

Although the microservice architecture is more reliable compared to the monolithic application architecture, deploying microservices on servers may impact the quality of service experienced by users, such as latency and bandwidth resource consumption. Especially in edge computing environments where resources are scarce and edge servers are highly distributed, unreasonable deployment of microservice instances may not only waste resources but even fail to satisfy the requirements of the service level agreement (SLA). In cloud computing environments, existing reliability enhancement technology deployment solutions do not consider the impact of latency on reliability and consume significant resources, making them unsuitable for resource-limited edge computing environments.

Currently, the checkpoint technology and redundant backup technology are common technologies for improving service reliability. The checkpoint technology periodically saves the system state as a mirror image, allowing for a rollback to a previous state in case of failure, thereby reducing recovery time. However, in edge computing environments, the method of using the checkpoint technology to improve service reliability is very inefficient. Because edge computing is decentralized and edge nodes operate independently, the complex invocation relationships between microservices and the presence of cascading rollbacks result in significant synchronization overhead for coordinating checkpoints, leading to a long recovery time. Moreover, edge nodes are difficult to maintain and have a high failure rate, making it challenging to simultaneously satisfy the service requirements of ultra-low latency and ultra-high reliability for extreme services.

The redundant backup technology ensures that when the primary instance fails, traffic can be redirected to the backup instance, and the backup instance can take over and continue providing services, which helps achieve lower latency while ensuring service reliability. Therefore, the redundant backup technology is more suitable for simultaneously satisfying the requirements of ultra-low latency and ultra-high reliability for extreme services in edge computing environments. Through container orchestration tools (such as Kubernetes), the deployment, management, scaling, and failover of microservices can be automated. However, the current challenge is how to determine the number of deployment instances for each microservice and deployment locations thereof, in order to reduce resource consumption while ensuring service latency and reliability requirements.

In cloud computing environments, there are many redundant backup deployment methods based on the abundant resources available in cloud computing centers. However, in edge computing environments, edge resources are scarce, and redundant backup deployment of microservice instances cannot be performed on a large scale. In addition, due to geographical location and commercial interests, information is not shared between different edge clouds, and the deployment location of microservice instances is also limited. Therefore, the redundant backup method for microservice instances in cloud computing centers cannot be directly applied to edge computing environments.

Regarding the issue of redundant backup deployment of microservice instances in edge computing environments, most of the existing technologies use heuristic and deep reinforcement learning (DRL) methods to solve it. However, as service scenarios become increasingly complex and service requirements become more diverse, the existing technologies still have the following shortcomings:

1. The heuristic method lacks feedback and adjustment mechanisms, making one-time decisions. This static, open-loop deployment of microservice instances cannot cope with dynamically arriving service requests and dynamically changing edge computing environments.

2. The existing DRL method can achieve the transition of microservice instances from static open-loop deployment to dynamic closed-loop deployment, but has not yet considered the impact of latency on redundant backup of the microservice instances. Latency and reliability are strongly coupled, rather than being two separate constraints. For dynamically changing edge computing environments, it is also necessary to consider reliability fluctuations of edge nodes caused by workload variations in the edge computing platform.

3. In the process of redundant backup deployment of microservice instances, service providers often have different objectives. For example, while ensuring service reliability, they need to reduce resource consumption in microservice instance deployment. However, due to reliability fluctuations caused by edge node workload, microservice instances are typically placed on edge nodes with lighter or even idle workloads, so as to reduce the number of redundant backup microservice instances and lower resource consumption. Although the resource consumption in microservice instance deployment is reduced, the number of operating edge nodes is increased, and edge nodes are the primary energy consumers. Therefore, service providers also need to minimize the number of operating edge nodes as much as possible. This category of issues remains largely unresolved.

SUMMARY

The objective of the present disclosure is to provide a redundant backup deployment method for microservice instances in edge computing environments.

A technical solution for achieving the objective of the present disclosure is a redundant backup deployment method for microservice instances in edge computing environments. The method includes the following steps:

step 1, sending, by a user, a service request, accessing a corresponding edge cloud, and signing a service level agreement (SLA) with an edge cloud service provider;

step 2, acquiring, by the edge cloud service provider, edge computing network topology information, and abstracting the edge computing network topology information into an undirected network graph;

step 3, establishing a multi-objective optimization mathematical model that considers a plurality of service deployment constraints by combining service information and the edge computing network topology information;

step 4, performing, by the edge cloud service provider, redundant backup deployment of a service based on the service information, the edge computing network topology information, and the multi-objective optimization mathematical model to satisfy the SLA, wherein Transformer-based deep reinforcement learning (T-DRL) is used to acquire redundant backup deployment of microservice instances and selection of a primary instance;

step 5, traversing the redundant backup deployment and a selection result of the primary instance to check whether the SLA is satisfied; if not satisfied, performing step 6; if satisfied, performing step 7;

step 6, for a service failing to satisfy the SLA, identifying a path thereof that fails to satisfy latency, and downgrading a switching priority of microservice instances on the path using a simulated annealing method until the SLA is satisfied; and step 7, under a condition where the SLA is satisfied, removing, based on a removal priority of the microservice instances, the microservice instances using a pruning algorithm until no more microservice instances can be removed.

Further, in the step 1, the service is linearly composed of microservices, and a j-th microservice of service $S_i$ is defined by a tuple $MS_{i,j}=(S_i, R_i, L_i, N_i, r_{i,j}, c_{i,j}, b_{i,j})$, where $S_i$ represents the service to which the microservice belongs, $R_i$, $L_i$, $N_i$ respectively represent a reliability requirement and a latency requirement of the service to which the microservice belongs and a number of the microservices included in the service, $r_{i,j}$ represents software reliability of the microservice, and $c_{i,j}$ and $b_{i,j}$ represent computing resources and bandwidth resources required for the microservice, respectively.

Further, in the step 2, an edge computing environment is modeled as an undirected graph G(V, E) by using a network modeling method; $V=(V_1, V_2, \ldots, V_n)$ represents a set consisting of n edge nodes, and $E=\{e_{i,j}|i, j \in n, i \neq j\}$ represents a set of links in the edge environment, where $e_{i,j}$ represents a link between edge nodes $V_i$ and $V_j$; the edge node $V_i$ consists of a triple $\left(R_{v_i}, C_{v_i}, UC_{v_i}\right)$, where $R_{v_i}$, $C_{v_i}$, and $UC_{v_i}$ respectively represent hardware reliability, a contained computing resource, and a unit computing resource cost of the edge node $V_i$; the link $e_{i,j}$ consists of a triple $<L_{e_{i,j}}, B_{e_{i,j}}, UB_{e_{i,j}}>$, where $L_{e_{i,j}}$, $B_{e_{i,j}}$, and $UB_{e_{i,j}}$ respectively represent a transmission latency, a contained bandwidth resource, and a unit bandwidth resource cost of the link $e_{i,j}$.

Further, in the step 3, establishing the multi-objective optimization model that considers the plurality of the service deployment constraints includes minimizing a deployment cost of the service while minimizing a number of active edge nodes, and specific objective functions are as follows:

3.1 Objective Function 1: Minimizing the Deployment Cost of the Service

The service is composed of the microservices. A total cost of deploying the microservices corresponds to the deployment cost of the service, and the deployment cost of the service $S_i$ is as follows:

$$\text{cost}(S_i) = \sum_{j=1}^{N_i} \sum_{k=1}^{n} UC_{V_k} c_{i,j} x_{V_k}^{i,j} + \sum_{j=1}^{N_i} \sum_{e_{c,d} \in L} UB_{e_{c,d}} b_{i,j} z_{e_{c,d}}^{i,j}$$

In the formula, $$x_{V_k}^{i,j}$$

represents a 0-1 variable indicating whether a microservice $MS_{i,j}$ is placed on an edge node $V_k$, and $$z_{e_{c,d}}^{i,j}$$

represents a 0-1 variable indicating whether a primary instance of the microservice $MS_{i,j}$ passes through a link $e_{c,d}$.

The objective function 1 is as follows:

$$f_1 = \min\left(\sum_{i \in S} \text{cost}(S_i)\right)$$

In the formula, S represents a set of all services.

3.2 Objective Function 2: Minimizing the Number of Active Edge Nodes

The objective function 2 is as follows:

$$f_2 = \min\sum_{k=1}^{n} A_{r_k}$$

In the formula, $$A_{V_k}$$

represents a 0-1 variable; if $$A_{V_k}$$

is 1, it indicates that a microservice instance is deployed on the edge node $V_k$, and if $A_{v_k}$ is 0, it indicates that no microservice instance is deployed.

Further, in the step 3.1, the deployment cost of the service needs to be normalized and is expressed as follows:

Normalization of the deployment cost of the service is defined as follows:

$$f_1 = \frac{1}{|S| \cdot \theta_{cost(S)}} \min\left(\sum_{i \in S} \text{cost}(S_i)\right)$$

In the formula, |S| represents a number of services, and $\theta_{cost(S)}$ represents a value of a maximum deployment cost among the services S.

In the step 3.2, the number of active edge nodes needs to be normalized and is specifically expressed as follows:

Normalization of the number of active edge nodes is defined as follows:

$$f_2 = \frac{1}{|n|} \min\sum_{k=1}^{n} A_{V_k}$$

In the formula, |n| represents a number of edge nodes in the edge environment.

Further, in the steps 3.1 and 3.2, the plurality of service constraints need to be considered to implement the multi-objective service deployment optimization model, and the constraints are as follows:

1): Integrity of Service $$\sum_{k=1}^{n} x_{V_k}^{i,j} \geq 1, \forall i \in S, j \in MS^i$$

In the formula, $MS^i$ represents a set of microservices of the service $S_i$; this constraint ensures that each microservice of the service has at least one microservice instance, thereby ensuring that the service is capable of operating.

2): Limitation of Primary Instance $$\sum_{k=1}^{n} y_{V_k}^{i,j} = 1, \forall i \in S_i, j \in MS^i$$

In the formula, $$y_{V_k}^{i,j}$$

represents a 0-1 variable indicating whether the j-th microservice of the service $S_i$ places the primary instance at the edge node $V_k$, and a primary path formed by the primary instances of the service is responsible for traffic forwarding and service provision; when the primary instance fails, a switch will be made to a backup instance according to the switching priority of the microservice instances; this constraint ensures that each microservice has one primary instance, thereby ensuring that the primary path is capable of providing services.

3): Assurance of Service Reliability

A propagation latency $L^{i,k}$ of a k-th path $p^{i,k}$ of the service $S_i$ is calculated as follows:

$$L^{i,k} = \sum_{e_{c,d} \in p^{i,k}} L_{e_{c,d}}, p^{i,k} \in P^i$$

In the formula, $P^i$ represents a path combination formed by all microservice instances of the service $S_i$.

Then, a path failing to satisfy the latency requirement is identified, and an increment to the service reliability caused by the path is calculated to obtain actual service reliability.

$$R_i^{act} = R(S_i) - \sum_{p^{i,k} \in \overline{p^i}} \Delta R_{s_i}\left(p^{i,k}\right)$$

In the formula, $R(S_i)$ represents the service reliability without considering the latency, $$\overline{p^i}$$

represents a set of paths failing to satisfy the latency requirement, and $\Delta R_{S_i}(p^{i,k})$ represents the increment to the service reliability caused by the path $p^{i,k}$.

The actual service reliability $$R_i^{act}$$

needs to satisfy the reliability requirement of the service:

$$R_i^{act} \geq R_i$$

4): Limitation of Capacity $$\sum_{i\in S}\sum_{j\in MS^i} c^{i,j} x_{v_k}^{i,j} \le C_{v_k}, \forall_{V_k} \in V$$

$$\sum_{i\in S}\sum_{j\in MS^i} b^{i,j} z_{e_{c,d}}^{i,j} \le B_{c,d}, \forall e_{c,d} \in E$$

Constraint ① ensures that total computing resources required for the microservice instances deployed on the edge node do not exceed computing resources available in the edge node, and constraint ② ensures that total bandwidth resources occupied by the microservice instances on the link do not exceed bandwidth resources of the link.

Further, in the step 4, using the T-DRL to acquire the redundant backup deployment of the microservice instances and the selection of the primary instance is specifically as follows:

4.1 An encoder uses a linear layer to embed edge computing environment information and the service information into a high-dimensional space separately to obtain initial embedding information, specifically as follows:

$$x_{v_k}^{(0)} = W_0[R_{v_k}, C_{v_k}, UC_{v_k}] + b_0$$

$$y_{e_{c,d}}^{(0)} = W_0[L_{e_{c,d}}, B_{e_{c,d}}, UB_{e_{c,d}}] + b_0$$

$$z_{i,j}^{(0)} = W_0[S_i, R_i, L_i, N_i, r_{i,j}, c_{i,j}, b_{i,j}] + b_0$$

Where $$x_{v_k}^{(0)}$$

represents embedding of an edge node $v_k$ at layer 0, $$y_{e_{c,d}}^{(0)}$$

represents embedding of a link $e_{c,d}$ at the layer 0, $$z_{i,j}^{(0)}$$

represents embedding of a microservice $MS_{i,j}$ is at the layer 0, $W_0$ and $b_0$ represent linearly varying parameters, and a [ . . . , . . . ] operation is used to concatenate information of a same dimension together.

4.2 The obtained initial embedding information $$x_{v_k}^{(0)}, y_{e_{c,d}}^{(0)}, \text{ and } z_{i,j}^{(0)}$$

is input into the encoder and processed through L identical layers to obtain final embedding information, $x^{(i)}$, $y^{(i)}$, and $z^{(i)}$, where each layer includes a multi-head attention layer, a residual connection layer, a normalization layer, and a feedforward network layer; edge node information of the edge computing environment is $$x^{(L)} = \text{mean}(x_{v_1}^{(L)}, x_{v_2}^{(L)}, \dots, x_{v_k}^{(L)}),$$

link information is $$y^{(L)} = \text{mean}(y_{e_{1,2}}^{(L)}, y_{e_{1,2}}^{(L)}, \dots, y_{e_{c,d}}^{(L)}),$$

and the service information is $$z^{(L)} = \text{mean}(z_{1,1}^{(L)}, z_{1,2}^{(L)}, \dots, z_{i,j}^{(L)});$$

finally, all embedding information is concatenated through the linear layer to obtain global information $I^{(i)}$.

$$I^{(L)} = W_0[x^{(L)}, y^{(L)}, z^{(L)}] + b_0.$$

4.3 A K value for K-fault tolerance deployment of the service is determined without considering the latency, and the K value of the service $S_i$ is calculated as follows:

$$\left[1 - \left(1 - (r_{i,j})_{min}(r_{v_k})_{min}\right)^k\right]^{N_i} \ge R_i$$

$$K \ge \frac{\log\left(1 - R_i^{\frac{1}{N_i}}\right)}{\log\left(1 - (r_{i,j})_{min}(r_{v_k})_{min}\right)}$$

In the formula, $(r^{i,j})_{min}$ represents minimum software reliability of the microservices composing the service $S_i$ and $$(r_{v_k})_{min}$$

represents minimum hardware reliability of the edge nodes in the edge environment.

4.4 A decoding process is to model a redundant backup deployment problem as a Markov decision process, where each microservice is considered as an agent, the edge environment and the service information serve as a state set, and an action set selects an edge node for each microservice to deploy a microservice instance.

A decoder uses context information from the encoder, with the agent serving as a query vector and the edge node serving as a key vector and a value vector, and combines a mask rule to generate a probability vector for deploying each microservice instance at the edge node; the agent selects a next edge node to deploy a microservice instance at each time step based on a policy of a DRL model until the K-fault tolerance redundant backup deployment of the microservice is completed.

4.5 When the K-fault tolerance deployment of the microservice is completed, the decoder uses the context information of the encoder and a condition of the K-fault tolerance deployment, with the agent serving as the query vector and the edge node serving as the key vector and the value vector, and combines the mask rule to generate a probability vector for each microservice instance to serve as the primary instance; the agent selects the primary instance at each time step based on the policy of the DRL model and constructs a primary path for each service.

4.6 Neural network parameters $\theta$ are trained using a policy gradient method to update the policy of the DRL model, optimize a policy network, and maximize an expected cumulative reward, where the policy gradient method includes two networks: the policy network and a baseline network; the policy network selects an action from the probability vector by using a sampling method, and the baseline network selects an action from the probability vector by using a greedy policy; the neural network parameters are optimized by calculating a gradient of a loss function as follows:

$$\nabla_\theta L(\theta) = \frac{1}{B} \sum_{i=1}^{B} \left[ (R(\pi_i) - R(\pi^{BL})) \nabla_\theta \log p_\theta(\pi_i) \right]$$

In the formula, B represents a batch size, $R(\pi_i)$ represents a reward under the policy network, and $R(\pi^{BL})$ represents a reward under the baseline network.

Further, in the step 4.6, during each training batch, a paired t-test is performed on the two networks, and if significant at a 95% confidence level, parameters of the policy network are used to replace parameters of the baseline network.

Further, in the step 5, traversing the redundant backup deployment and the selection result of the primary instance to check whether the SLA is satisfied is specifically as follows:

First, reliability of a microservice instance is calculated for each microservice. The reliability of the instance of the microservice $MS_{i,j}$ deployed at the edge node $V_k$ is calculated as follows:

$$R_{v_k}^{i,j} = r_{i,j} R_{v_k} x_{v_k}^{i,j}$$

$$X_{v_k}^{i,j}$$

represents a 0-1 variable, and $R_{v_k}$ represents the hardware reliability of the edge node $v_k$; for each microservice, a switching priority $$\beta_{v_k}^{i,j}$$

of the microservice instance is obtained based on the reliability of the microservice instance.

Then, a path that fails to satisfy the service latency requirement is identified for each service, and an increment to the service reliability caused by the path is calculated. An increment to the service reliability caused by path $p^{i,k}$ is as follows:

$$\Delta R_{S_i}(p^{i,k}) = R(p^{i,k}) \prod_{p^{i,k,j} \neq p_{pri}^{i,j}} \left( \prod_{\substack{v_k \in \mu_{i,j}, \beta_{p^i,k,j}^{i,j} > \beta_{v_k}^{i,j}, v_k \notin p^{i,k}}} (1 - R_{v_k}^{i,j}) \right)$$

In the formula, $R(p^{i,k})$ represents the reliability of the path $p^{i,k}$, $p^{i,k,j}$ and $$p_{pri}^{i,j}$$

respectively represent edge nodes where the j-th microservice of the service $S_i$ of the path $p^{i,k}$ and primary path $$p_{pri}^{i}$$

is placed, and $V_{i,j}$ is represents a set of edge nodes where the microservice $MS_{i,j}$ is placed.

Finally, the reliability increment of the path that fails to satisfy the latency requirement is subtracted from the service reliability to obtain actual service reliability, and whether the actual service reliability satisfies the SLA is checked.

Further, in the step 7, the pruning algorithm is as follows:

Under a condition where the SLA is satisfied, unnecessary microservice instances need to be removed according to a pruning priority of the microservice instances, the pruning priority $$\gamma_{v_k}^{i,j}$$

of the microservice instances being as follows:

$$\gamma_{v_k}^{i,j} = \omega_1 UC_{v_k} c_{i,j} + \omega_2 (1 - A_{v_k})$$

In the formula, $\omega_1$ represents a weight of objective function 1, $\omega_2$ represents a weight of objective function 2, and $UC_{v_k}$ represents the unit computing resource cost of the edge node $V_k$.

Compared with the prior art, the remarkable advantages of the present disclosure are as follows: (1) For different hybrid service requests with dynamic arrivals, the redundant backup technology is adopted in resource-scarce edge computing environments to enhance service reliability; and the T-DRL solution method achieves the transition of redundant backup deployment of microservice instances from static open-loop to dynamic closed-loop deployment, while considering the influence of latency during the redundant backup process and the reliability fluctuation of edge nodes. (2) Under the condition where the reliability and latency requirements of the service are satisfied, the simulated annealing method is adopted to downgrade the switching priority of the microservice instances, thereby increasing the service acceptance rate; the pruning algorithm is adopted to reduce the redundant backup resource consumption. Compared with other methods, the present disclosure demonstrates significant advantages in terms of the service acceptance rate, the number of redundant backups of microservice instances, the number of operating edge nodes, and algorithm convergence.

DESCRIPTION OF THE EMBODIMENTS

Figure 1:
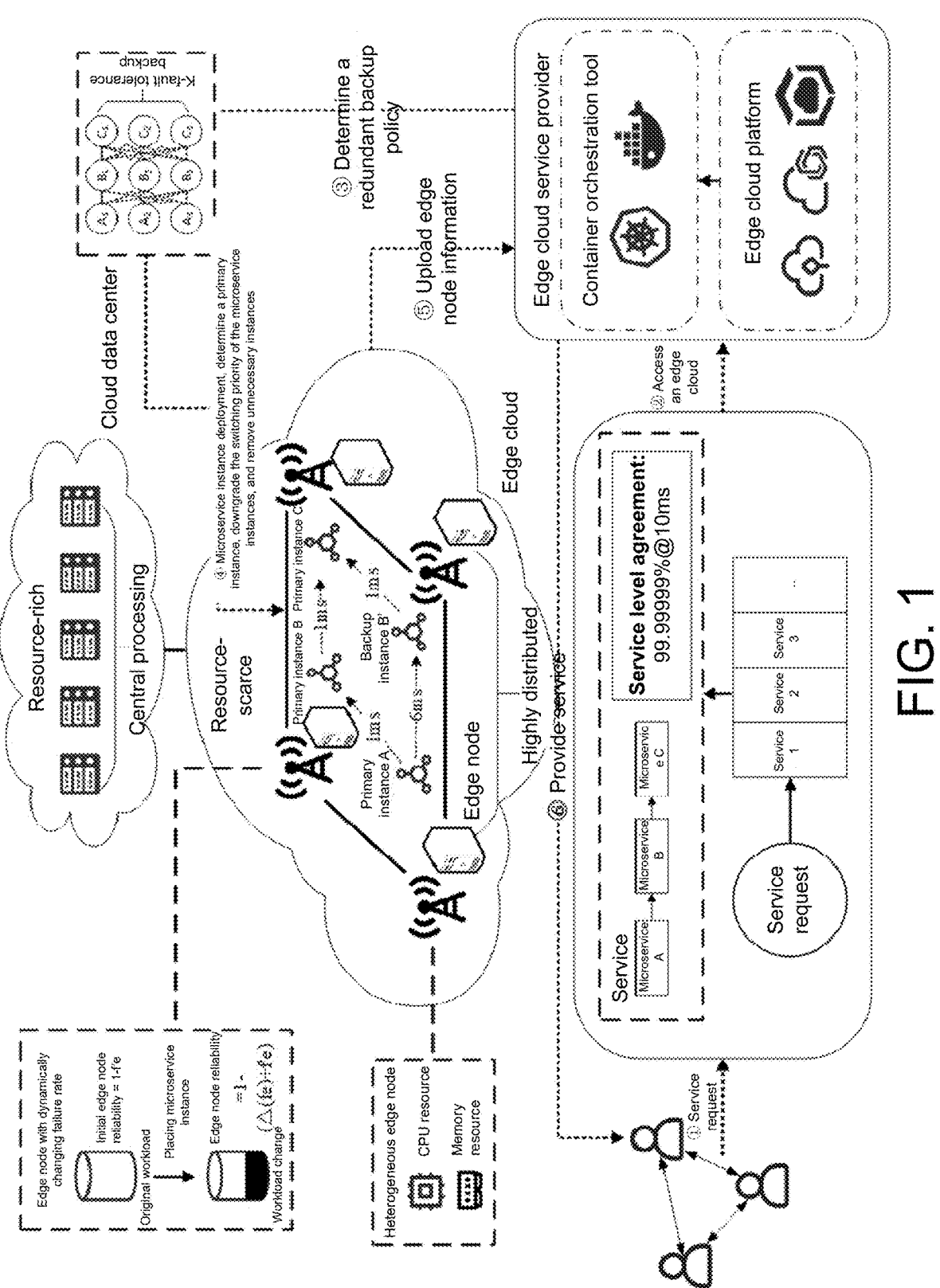
FIG. 1 is a schematic diagram of service deployment by an edge cloud service provider according to the present disclosure.

The technical problem to be solved by the present disclosure is shown in FIG. 1. A user sends a service request and accesses a corresponding edge cloud. The edge cloud service provider uses a container orchestration tool to reasonably deploy microservice instances on edge nodes to provide the service. The edge node is composed of a base station and an edge server. The base station is responsible for receiving signals from a mobile device and transmitting the signals to the edge server. A plurality of edge nodes are connected via wired links to form an edge cloud. Heterogeneity of edge nodes is reflected in different computing resources, while the dynamic nature is mainly reflected in the difficulty of maintaining the edge nodes in the edge cloud platform, with the reliability thereof fluctuating according to a workload. The edge cloud service provider determines a redundant backup policy for the service based on information of the edge node, i.e., determining the K-fault tolerance backup of the microservice. If the service is processed in a resource-rich cloud computing environment, microservice instances can be deployed according to the redundant backup policy. However, in the resource-scarce edge computing environment, if only the K-fault tolerance backup is performed, subsequent arriving services do not have sufficient resources for redundant backups, leading to a decrease in the service acceptance rate. Moreover, according to the service level agreement (SLA), services in the edge computing environment have extremely high requirements for the service provider, including service reliability and latency. In the edge computing environment, after determining the redundant backup policy for a service, it is necessary to select a primary instance for each microservice. The primary instances form a primary path and are responsible for service processing. When a primary instance fails, the switch will be made immediately to a backup instance. However, switching to the backup instance may result in latency of service processing that does not satisfy the latency requirement in the SLA. Therefore, under the premise of satisfying service reliability, backup instances failing to satisfy the latency requirement need to be removed to reduce resource consumption. When the above steps are completed, the relevant information of the edge node is uploaded to the edge cloud service provider, which then provides services to the user. The edge cloud service provider continues to process dynamically arriving services, thereby achieving dynamic closed-loop deployment of microservice instances. To achieve the above objective, the technical solution mainly includes the following steps.

In step 1, a user sends a service request, accesses a corresponding edge cloud, and signs an SLA with an edge cloud service provider;

The user signs the SLA with the edge cloud service provider. The SLA mainly includes service reliability, latency, and service composition.

In step 2, the edge cloud service provider acquires edge computing network topology information and abstracts the edge computing network topology information into an undirected network graph;

The edge computing network topology information and related resource conditions are monitored and acquired based on a controller.

In step 3, a multi-objective optimization mathematical model that considers a plurality of service deployment constraints is established by combining service information and the edge computing network topology information;

The problem of redundant backup deployment of microservice instances is abstracted into a multi-objective optimization mathematical model, which reduces the number of active edge nodes while reducing the deployment cost of the service.

In step 4, the edge cloud service provider performs redundant backup deployment of a service based on the service information, the edge computing network topology information, and the multi-objective optimization mathematical model to satisfy the SLA, where Transformer-based deep reinforcement learning (T-DRL) is adopted to acquire redundant backup deployment of the microservice instances and selection of a primary instance;

Due to the highly complex and multidimensional nature of heterogeneous edge computing environments and service information, conventional algorithms struggle to effectively process complex high-dimensional data and fail to capture complex nonlinear relationships. Therefore, according to the present disclosure, the information is embedded into a high-dimensional space through an encoder module in the Transformer, and a decoder is used to acquire the optimal redundant backup deployment of microservice instances and the selection of a primary instance.

In step 5, the redundant backup deployment and the selection result of the primary instance are traversed to check whether the SLA is satisfied. If not satisfied, step 6 is performed; if satisfied, step 7 is performed;

Whether actual service reliability satisfies the SLA is determined based on the redundant backup deployment and the selection result of the primary instance. Corresponding processing measures are provided for different results.

In step 6, the path that fails to satisfy latency is identified for the service that fails to satisfy the SLA, and the switching priority of microservice instances on the path is downgraded until the SLA is satisfied;

Through the microservice instance deployment solution and the selection of the primary instance obtained in step 4, in consideration of the latency, the actual service reliability may fail to satisfy the service requirement. The actual service reliability needs to be improved by downgrading the switching priority of the microservice instances.

In step 7, under the condition where the SLA is satisfied, a pruning algorithm is adopted to remove the microservice instances according to the removal priority of the microservice instances until no more microservice instances can be removed;

Due to the scarcity of resources in edge computing environments, it is necessary to use the pruning algorithm to reduce the deployment cost and resource consumption of microservice instances under the condition where the SLA is satisfied.

In step 8, the edge cloud service provider places the service on the primary instance for processing, thereby providing services to the user;

The primary path is responsible for traffic forwarding and service processing, providing services for the user.

13

Figure 2:
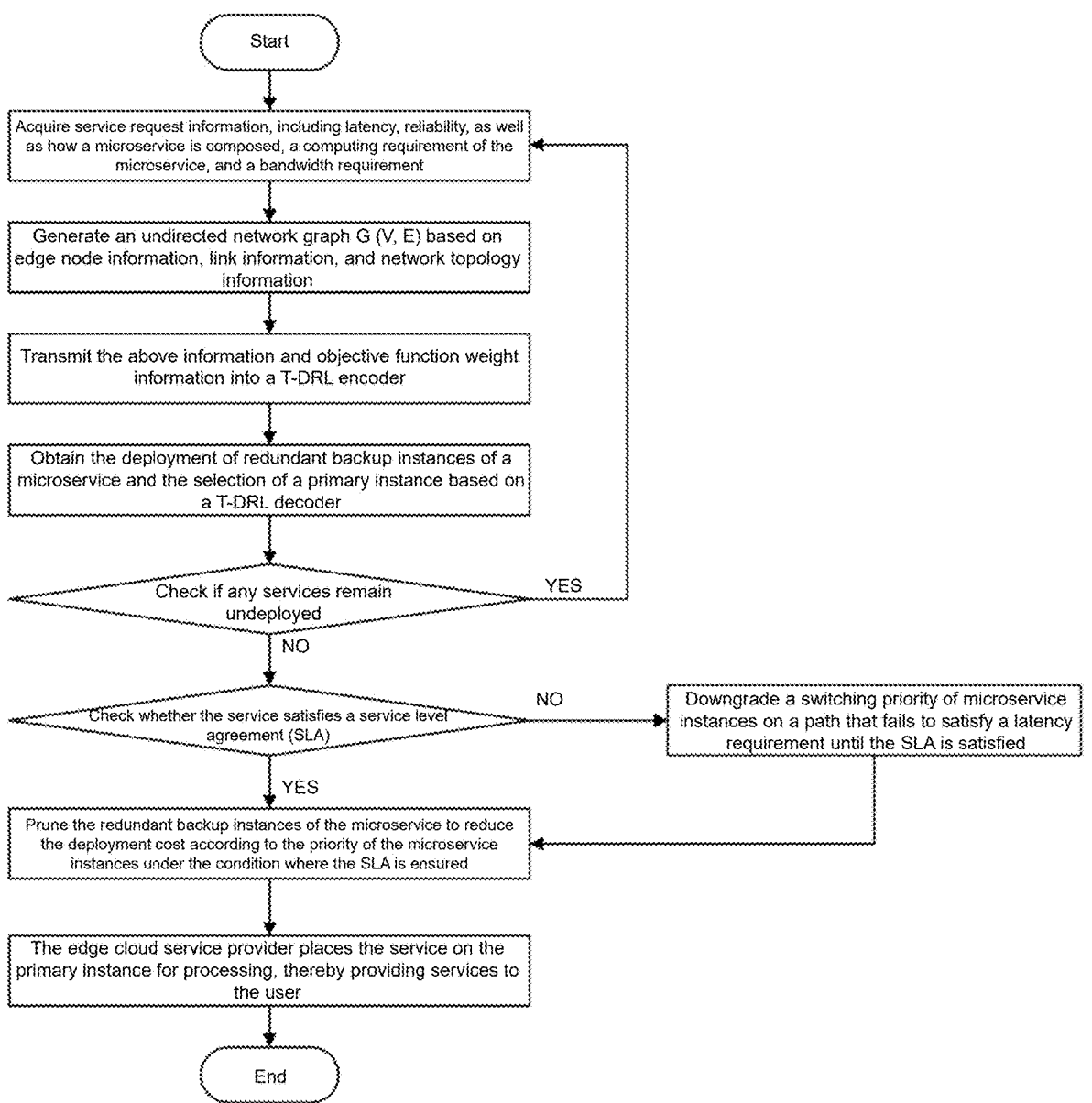
FIG. 2 is a schematic flowchart of a redundant backup deployment method for microservice instances satisfying a service level agreement (SLA) in edge computing environments according to the present disclosure.
Figure 3:
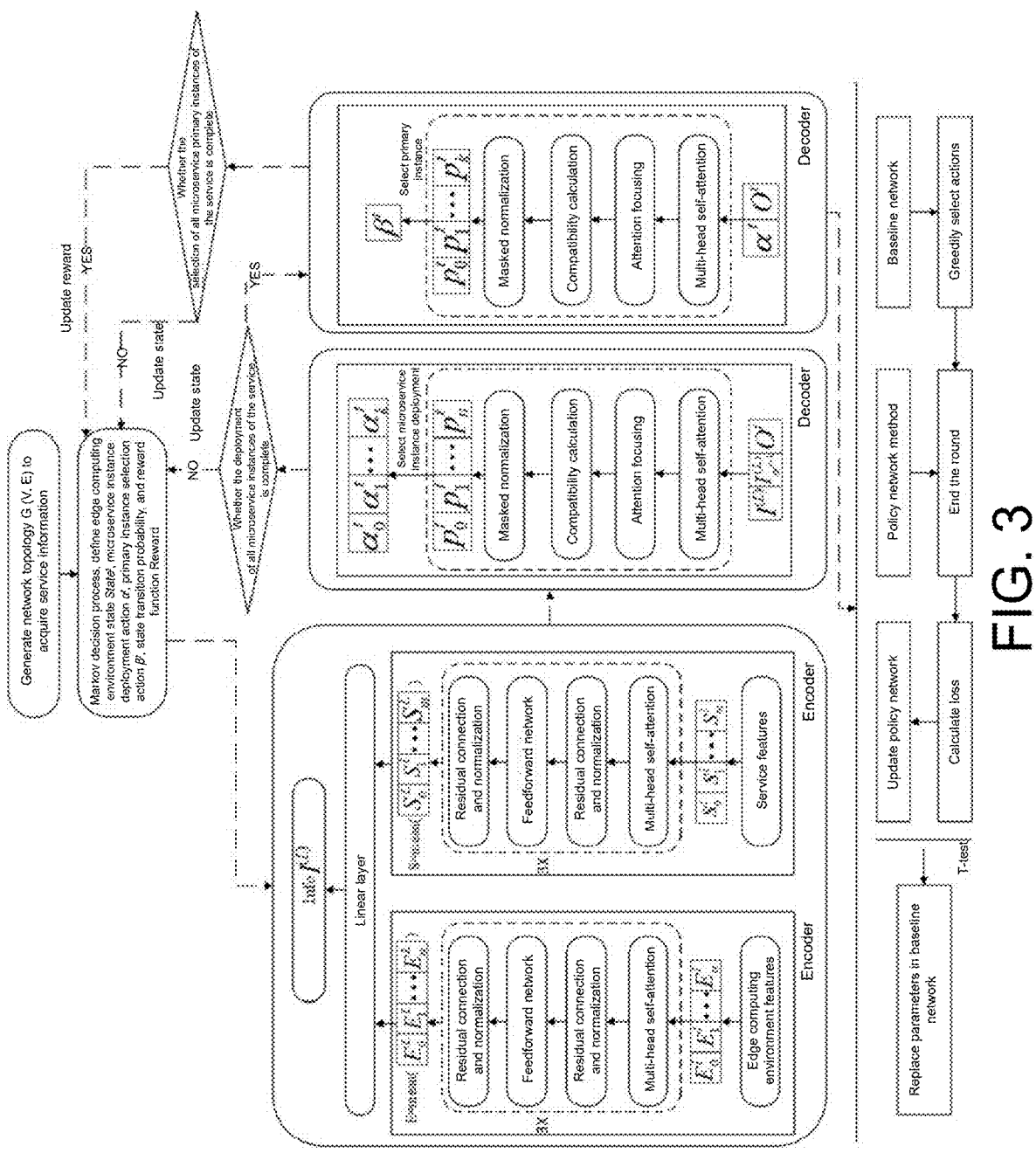
FIG. 3 is a schematic diagram of a process for solving the redundant backup deployment of microservice instances and the selection of a primary instance using Transformer-based deep reinforcement learning (T-DRL) according to the present disclosure.

The present disclosure is further described below with reference to FIGS. 2 and 3 and the embodiments.

1. A user sends a service request, accesses a corresponding edge cloud, and signs an SLA with an edge cloud service provider.

The SLA signed between the user and the edge cloud service provider mainly includes service reliability, latency, and service composition. The edge cloud service provider must provide services for the user according to the SLA. The service is linearly composed of microservices, and the j-th microservice of the service $S_i$ is defined by a tuple $MS_{i,j}=(S_i, R_i, L_i, N_i, r_{i,j}, c_{i,j}, b_{i,j})$, where $S_i$ represents the service to which the microservice belongs, $R_i$, $L_i$, $N_i$ respectively represents a reliability requirement and a latency requirement of the service to which the microservice belongs and the number of microservices included in the service, $r_{i,j}$ represents software reliability of the microservice, and $c_{i,j}$ and $b_{i,j}$ represent computing resources and bandwidth resources required for the microservice, respectively.

2. The edge cloud service provider acquires edge computing network topology information and abstracts the edge computing network topology information into an undirected network graph.

The edge cloud service provider obtains the edge computing network topology information and resource conditions through a controller and models an edge computing environment as an undirected graph $G(V, E)$ using a network modeling method. $V=(V_1, V_2, \ldots, V_n)$ represents a set consisting of n edge nodes, and $E=\{e_{i,j}|i, j \in n, i \neq j\}$ represents a set of links in the edge environment, where $e_{i,j}$ represents a link between edge nodes $V_i$ and $V_j$. The edge node $V_i$ consists of a triple $(R_{v_i}, C_{v_i}, UC_{v_i})$, where $R_{v_i}$, $C_{v_i}$, and $UC_{v_i}$ respectively represent hardware reliability, a contained computing resource, and a unit computing resource cost of the edge node $V_i$. The link $e_{i,j}$ consists of a triple $\langle L_{e_{i,j}}, B_{e_{i,j}}, UB_{e_{i,j}} \rangle$, where $L_{e_{i,j}}$, $B_{e_{i,j}}$, and $UB_{e_{i,j}}$ respectively represent a transmission latency, a contained bandwidth resource, and a unit bandwidth resource cost of the link $e_{i,j}$.

3. A multi-objective optimization mathematical model that considers a plurality of service deployment constraints is established in combination with service information and the edge computing network topology information.

While reducing the deployment cost of the service, it is also necessary to decrease the number of active edge nodes since the edge nodes are the primary energy consumers.

1) Objective Function 1: Minimizing the Deployment Cost of the Service

The service is composed of the microservices. The total cost of deploying the microservices corresponds to the deployment cost of the service, and the deployment cost of the service $S_i$ is as follows:

$$\text{cost}(S_i) = \sum_{j=1}^{N_i}\sum_{k=1}^{n} UC_{v_k}c_{i,j}x_{v_k}^{i,j} + \sum_{j=1}^{N_i}\sum_{e_{c,d}\in L} UV_{e_{c,d}}b_{i,j}z_{e_{c,d}}^{i,j}$$

In the formula, $$x_{v_k}^{i,j}$$

represents a 0-1 variable indicating whether the microservice $MS_{i,j}$ is placed on an edge node $V_k$, and

14

$$z_{e_{c,d}}^{i,j}$$

represents a 0-1 variable indicating whether a primary instance of the microservice $MS_{i,j}$ is passes through a link $e_{c,d}$.

The objective function 1 is as follows:

$$f_1 = \min\left(\sum_{i\in S}\text{cost}(S_i)\right)$$

In the formula, S represents the set of all services.

Since the two objective functions are different in scale, it is necessary to normalize the objective functions to prevent the objective function with a larger scale from dominating the optimization process. The normalization of the deployment cost of the service is defined as:

$$f_1 = \frac{1}{|S|\cdot\theta_{cost(S)}}\min\left(\sum_{i\in S}\text{cost}(S_i)\right)$$

In the formula, $|S|$ represents the number of services, and $\theta_{cost(S)}$ represents the value of the maximum deployment cost among the services S.

2) Objective Function 2: Minimizing the Number of Active Edge Nodes

The objective function 2 is as follows:

$$f_2 = \min\sum_{k=1}^{n}A_{v_k}$$

In the formula, $A_{v_k}$ represents a 0-1 variable; if $A_{v_k}$ is 1, it indicates that a microservice instance is deployed on the edge node $V_k$, and if $A_{v_k}$ is 0, it indicates that no microservice instance is deployed.

Normalization of the number of active edge nodes is defined as follows:

$$f_2 = \frac{1}{|n|}\min\sum_{k=1}^{n}A_{v_k}$$

In the formula, $|n|$ represents the number of edge nodes in the edge environment.

3) Constraints (1): Integrity of Service $$\sum_{k=1}^{n}x_{v_k}^{i,j} \geq 1, \forall i \in S, j \in MS^i$$

In the formula, $MS^i$ represents a set of microservices of the service $S_i$: this constraint ensures that each microservice of the service has at least one microservice instance, thereby ensuring that the service is capable of operating.

(2): Limitation of Primary Instance $$\sum_{k=1}^{n} y_{v_k}^{i,j} = 1, \forall i \in S_i, j \in MS^i$$

5

In the formula,

10

$$y_{v_k}^{i,j}$$

represents a 0-1 variable indicating whether the j-th microservice of the service $S_i$ places the primary instance at the edge node $V_k$, and a primary path formed by the primary instance of the service is responsible for traffic forwarding and service provision. When a primary instance fails, the switch will be made to a backup instance according to the switching priority of the microservice instances. This constraint ensures that each microservice has one primary instance, thereby ensuring that the primary path is capable of providing services.

(3): Assurance of Service Reliability

The propagation latency $L^{i,k}$ of a k-th path $p^{i,k}$ of the service $S_i$ is calculated as follows:

$$L^{i,k} = \sum_{e_{c,d} \in p^{i,k}} L_{e_{c,d}}, \, p^{i,k} \in P^i$$

In the formula, $P^i$ represents a path combination formed by all microservice instances of the service $S_i$.

Then, a path failing to satisfy the latency requirement is identified, and an increment to the service reliability caused by the path is calculated to obtain the actual service reliability.

$$R_i^{act} = R(S_i) - \sum_{p^{i,k} \in \overline{p^i}} \Delta R_{S_i}\left(p^{i,k}\right)$$

In the formula, $R(S_i)$ represents the service reliability without considering the latency, $$\overline{p^i}$$

represents a set of paths failing to satisfy the latency requirement, and $\Delta R_{S_i}(p^{i,k})$ represents the increment to the service reliability caused by the path $p^{i,k}$.

The actual service reliability $$R_i^{act}$$

needs to satisfy the reliability requirement of the service:

$$R_i^{act} \geq R_i$$

(4): Limitation of Capacity $$\sum_{i \in S} \sum_{j \in MS^i} c^{i,j} x_{v_k}^{i,j} \leq C_{v_k}, \forall v_k \in V \qquad 1$$

$$\sum_{i \in S} \sum_{j \in MS^i} b^{i,j} z_{e_{c,d}}^{i,j} \leq B_{e_{c,d}}, \forall e_{c,d} \in E \qquad 2$$

Constraint ① ensures that total computing resources required for the microservice instances deployed on the edge node do not exceed computing resources available in the edge node, and constraint ② ensures that total bandwidth resources occupied by the microservice instances on the link do not exceed bandwidth resources of the link.

4. The redundant backup deployment of the microservice instances and the selection of a primary instance are acquired using T-DRL.

1) Edge Computing Environment Information and Microservice Information Encoding

The edge computing environment information includes edge node information and link information. The edge node information includes the hardware reliability, the available computing resources, and the unit computing resource cost. The link information includes the propagation latency, the bandwidth resource, and the unit bandwidth resource cost of the link. The microservice information includes the service to which the microservice belongs, service reliability and latency requirements specified in the SLA, the number of microservices included in the service, the software reliability of the microservice, and required computing and bandwidth resources.

The encoder uses a linear layer to embed the edge computing environment information and the service information into a high-dimensional space separately to obtain initial embedding information $$x_{v_k}^{(0)}, y_{e_{c,d}}^{(0)}, \text{ and } z_{i,j}^{(0)},$$

specifically as follows:

$$x_{v_k}^{(0)} = W_0\left[R_{v_k}, C_{v_k}, UC_{v_k}\right] + b_0$$

$$y_{e_{c,d}}^{(0)} = W_0\left[L_{e_{c,d}}, B_{e_{c,d}}, UB_{e_{c,d}}\right] + b_0$$

$$z_{i,j}^{(0)} = W_0[S_i, R_i, L_i, N_i, r_{i,j}, c_{i,j}, b_{i,j}] + b_0$$

Where $$x_{v_k}^{(0)}$$

represents embedding of an edge node $V_k$ at layer 0, $$y_{e_{c,d}}^{(0)}$$

represents embedding of a link $e_{c,d}$ at the layer 0, $$z_{i,j}^{(0)}$$

represents embedding of a microservice $MS_{i,j}$ at the layer 0, $W_0$ and $b_0$ represent linearly varying parameters, and a [ . . . , . . . ] operation is used to concatenate information of a same dimension together.

The obtained initial embedding information $$x_{v_k}^{(0)}, y_{e_{c,d}}^{(0)}, \text{ and } z_{i,j}^{(0)}$$

is input into the encoder and processed through L identical layers to obtain final embedding information $$x_{v_k}^{(L)}, y_{v_k}^{(L)}, \text{ and } z_{v_k}^{(L)},$$

where each layer includes a multi-head attention layer, a residual connection layer, a normalization layer, and a feedforward network layer. Finally, all embedding information is concatenated through the linear layer to obtain global information $I^{(L)}$. Taking $$x_{v_k}^{(L)}$$

as an example, it first passes through the multi-head attention layer, where the input information is divided into a plurality of distinct parts, each part referred to as one "head". Each head is an independent attention layer with its own weight matrix, allowing each head to focus on different features within the information from various perspectives, such that the model can flexibly comprehend complex dependency relationships. For different embedding information, corresponding query(Query), key(Key), and value (Value) vectors are generated through linear transformation to calculate the correlation of the embedding information:

$$Q_{v_k}^{(0,i)} = W_q^{(0,i)} x_{v_k}^{(0)}$$
$$K_{v_k}^{(0,i)} = W_k^{(0,i)} x_{v_k}^{(0)}$$
$$V_{v_k}^{(0,i)} = W_v^{(0,i)} x_{v_k}^{(0)}$$

In the formula, $$W_q^{(0,i)}, W_k^{(0,i)}, \text{ and } W_v^{(0,i)}$$

respectively represent the query, key, and value weight matrices of the i-th head in the layer 0;

$$Q_{v_k}^{(0,i)}, K_{v_k}^{(0,i)}, \text{ and } V_{v_k}^{(0,i)}$$

respectively represent the query, key, and value vectors of the i-th head in the layer 0.

Then, the similarity between the query vector and the key vector is calculated using a dot-product-based method. The larger the dot product is, the stronger the correlation between the query vector and the key vector is. Next, these dot products are converted to a probability distribution using the softmax function to obtain an attention weight $$A(Q_{v_k}^{(0,i)}, K_{v_k}^{(0,i)}),$$

indicating which keys each query vector should focus on:

$$A(Q_{v_k}^{(0,i)}, K_{v_k}^{(0,i)}) = \text{softmax}\left(\frac{Q_{v_k}^{(0,i)}(K_{v_k}^{(0,i)})^T}{\sqrt{d_k}}\right)$$

The attention layer dimension of the M heads is $$d_k = \frac{d_h}{M}, d_h = 128$$

is set, and $d_k$ scaling is used to prevent an excessively large value, thereby making the attention weight distribution smoother and more stable.

Then, the attention output is obtained by performing a weighted summation on the attention weight and the value vector. Finally, attention outputs from all heads are concatenated and linearly transformed to generate the final output.

$$Z_{v_k}^{(0,i)} = A(Q_{v_k}^{(0,i)}, K_{v_k}^{(0,i)}) V_{v_k}^{(0,i)}$$
$$Z_{v_k}^{(0,i)} = [Z_{v_k}^{(0,1)}, Z_{v_k}^{(0,2)}, \dots, Z_{v_k}^{(0,M)}] W_0^{(0)}$$

In the formula, $$Z_{v_k}^{(0,i)}$$

represents the attention output of the edge node $V_k$ of the i-th head in the layer 0, and $$Z_{v_k}^{(0)}$$

represents the final attention layer output of the node $V_k$ in the layer 0.

$$Z_{v_k}^{(0)}$$

output by the attention layer is input to the residual connection and normalization layers, and the output of the normalization layer is then input to the feedforward network layer for nonlinear transformation and further processing:

$$BN_{v_k}^{(0)} = BN(x_{v_k}^{(0)} + Z_{v_k}^{(0)})$$
$$x_{v_k}^{(0)} = W_2 \text{Max}(0, W_1 BN_{v_k}^{(0)} + b_1) + b_2$$

$$BN_{v_k}^{(0)}$$

represents the output of the edge node $V_k$ after passing through the residual connection and normalization layers, and $$x_{v_k}^{(0)}$$

represents the output of the edge node $V_k$ in the current encoding layer, which is passed to the next encoding layer to obtain $$x_{v_k}^{(L)}$$

after L encoding layers. Edge node information of the edge computing environment is $$X^{(L)} = \text{mean}\big(x_{v_1}^{(L)}, x_{v_2}^{(L)}, \ldots, x_{v_k}^{(L)}\big).$$

Similarly, link information $$y^{(L)} = \text{mean}\big(y_{e_{1,2}}^{(L)}, y_{e_{1,3}}^{(L)}, \ldots, y_{e_{c,d}}^{(L)}\big)$$

and service information $$z^{(L)} = \text{mean}\big(z_{1,1}^{(L)}, z_{1,2}^{(L)}, \ldots, z_{i,j}^{(L)}\big)$$

of the edge computing environment can be obtained.

Finally, the edge node, the link, and the service information are concatenated through the linear layer to obtain the global information $I^{(L)}$:

$$I^{(L)} = W_0\big[x^{(L)}, y^{(L)}, z^{(L)}\big] + b_0$$

2) Determining the K Value for K-Fault Tolerance of the Service

The service $S_i$ is linearly composed of $N_i$ microservices, and the reliability requirement of the service is denoted as $R_i$; the software reliability of each microservice is denoted as $r_{i,j}$. The hardware reliability of the edge node is denoted as $r_{v_k}$, so the K-fault tolerance reliability guarantee needs to satisfy:

$$\big[1 - \big(1 - (r_{i,j})_{min}(r_{v_k})_{min}\big)^k\big]^{N_i} \geq R_i$$

$$K \geq \frac{\log\Big(1 - R_i^{\frac{1}{N_i}}\Big)}{\log\big(1 - (r_{i,j})_{min}(r_{v_k})_{min}\big)}$$

In the formula, $(r_{i,j})_{min}$ represents the minimum software reliability of the microservices composing the service, and $(r_{v_k})_{min}$ represents the minimum hardware reliability of the edge nodes in the edge environment.

3) Weight-Aware Processing

The problem of redundant backup deployment of microservice instances for each service can be understood as a Markov decision process, where each microservice is considered as one agent. When the agent selects the action $\alpha^t$, the weight states of the two objective functions need to be considered: (1) minimizing the cost of placing microservice instances; (2) minimizing the number of edge nodes in the operating state. The output after the weight-aware processing is as follows:

0192. $\theta^t = W_2 \text{Max}(0, W_1[R^t, C^t, B^t, \omega_1, \omega_2] + b_1) + b_2$ In the formula, $R^t$ represents the reliability of the service at time t, $C^t$ represents the computing resource of the edge node at time t, $B^t$ represents the bandwidth resource of the link at time t, $\omega_1$ represents the weight of the objective function 1, $\omega_2$ represents the weight of the objective function 2, and $W_1$, $W_2$, $b_1$, and $b_2$ represent linearly varying parameters.

4) Microservice Instance Deployment Decoding

At each time step t, the agent makes a corresponding action according to the current environment state $I^{(L)}$, the environment state $$I_{\alpha^{t-1}}^{(L)}$$

of the previous action, and the weight state $O^t$ and continuously maximizes the cumulative reward function through repeated training, i.e., maximizes the service reliability. Therefore, the decoder combines the output from the encoder with the output from the weight-aware processing to perform microservice instance deployment decoding. Then, based on the probability vector for selecting edge nodes for the microservice output by the decoder, the agent selects K edge nodes for each microservice based on the DRL model to deploy the microservice instances, thereby achieving K-fault tolerance.

The current environment state $I^{(L)}$ mainly includes edge node information, link information, and service information, and $$I^{(L)}, I_{\alpha^{t-1}}^{(L)}$$

is concatenated with the weight-aware output $$O^t, \big[I^{(L)}, I_{\alpha^{t-1}}^{(L)}, O^t\big].$$

Subsequently, the context information of $$\big[I^{(L)}, I_{\alpha^{t-1}}^{(L)}, O^t\big]$$

is calculated through the multi-head attention (MHA) layer. The query vector is the embedding of the agent, and the key vector and the value vector are defined as the embedding of the edge node:

$$Q^t = W_Q\big[I^{(L)}, I_{\alpha^{t-1}}^{(L)}, O^t\big]$$

$$K = W_K x^{(L)}$$

$$V = W_V x^{(L)}$$

Then, the compatibility between each edge node and the microservice instance is calculated through the attention mechanism.

$$\beta^t = C \cdot \tanh\left(\frac{(Q^t)^T K}{\sqrt{d_k}}\right)$$

Not all edge nodes can host the current microservice instance. Therefore, a mask rule is set to exclude edge nodes where hosting is not allowed. The mask rule for whether a microservice can be placed at the edge node j is defined as follows:

$$\text{mask}_{i,j}^t = \begin{cases} 1, & \text{if the computing resource required for the} \\ & \quad \text{microservice } i \text{ exceeds the computing} \\ 0, & \text{otherwise} \end{cases}$$

Finally, the probability vector for selecting edge nodes for the microservice is generated by combining the mask rule with the compatibility vector between edge nodes and the microservice. According to the requirement of K-fault tolerance, K nodes are selected from the probability vector to deploy instances of the microservice:

0205. $p^t = softmax(\beta^t + N \cdot \text{mask}_{i,j}^t)$

In the formula, N represents a large negative value, if $$\text{mask}_{i,j}^t$$

it can be ensured that the node j will not be selected by the microservice i.

5) Primary Instance Selection Decoding

The microservice instance deployment decoding outputs the actions $$(a_0^t, \alpha_1^t, \dots, a_k^t)$$

of selecting edge nodes for the microservice. When all the microservices of the service complete the K-fault tolerance deployment, all actions $$(a_0^t, \alpha_1^t, \dots, a_k^t)$$

and the weight state $O^t$ thereof are used as input for the primary instance selection decoder. The process and structure of the primary instance selection decoder and the microservice instance deployment decoder are consistent. According to the primary path of the service, the bandwidth requirement needs to be satisfied to formulate a mask rule, which is defined as follows:

$$\text{mask}_{a,b}^t = \begin{cases} 1, & \text{if the bandwidth between microservice instance} \\ & \quad a \text{ and microservice instance } b \text{ fails} \\ 0, & \text{otherwise} \end{cases}$$

Finally, the decoder outputs a probability vector of microservice instances as primary instances, and the agent selects one instance as the primary instance for each microservice based on the DRL model.

6) Model Training

Neural network parameters θ are trained using a policy gradient method to update the policy of the DRL model and optimize the policy network, thereby maximizing the expected cumulative reward. The policy gradient method includes two networks: the policy network and the baseline network. The policy network selects an action from the probability vector by using a sampling method, and the baseline network selects an action from the probability vector by using a greedy policy. The neural network parameters are optimized by calculating the gradient of the loss function as follows:

$$\nabla_\theta L(\theta) = \frac{1}{B} \sum_{i=1}^B \left[ \left(R(\pi_i) - R(\pi^{BL})\right) \nabla_\theta \log p_\theta(\pi_i) \right]$$

In the formula, B represents the batch size, $R(\pi_i)$ represents a reward under the policy network, and $$R(\pi^{BL})$$

represents a reward under the baseline network. During each training batch, the model performs a paired t-test on the two policies, and if significant at a 95% confidence level, parameters of the policy network are used to replace parameters of the baseline network. In addition, an Adam optimizer minimizes $\nabla_\theta L(\theta)$ to update all parameters.

5. The redundant backup deployment and the selection result of the primary instance are traversed to check whether the SLA is satisfied. If not satisfied, step 6 is performed; if satisfied, step 7 is performed.

Since the T-DRL does not consider the impact of latency on reliability, it is necessary to determine whether the actual service reliability satisfies the SLA based on the redundant backup deployment and the selection of the primary instance. Corresponding processing measures are provided for different results.

6. For a service failing to satisfy the SLA, the actual service reliability is improved by downgrading the switching priority of the microservice instances.

For a service failing to satisfy the SLA, the path thereof that fails to satisfy latency is identified, and the switching priority of the microservice instances on the path is downgraded until the SLA is satisfied. Details are as follows:

First, the reliability of each microservice instance is calculated, and the reliability of the instance of the microservice $MS_{i,j}$ deployed at the edge node $V_k$ is calculated as follows:

$$R_{v_k}^{i,j} = r_{i,j} R_{v_k} x_{v_k}^{i,j}$$

In the formula, $r_{i,j}$ represents the software reliability of the microservice $MS_{i,j}$, $R_{v_k}$ represents the hardware reliability of the edge node $V_k$, and $$x_{v_k}^{i,j}$$

represents a 0-1 variable indicating whether the instance of the microservice $MS_{i,j}$ is placed on the edge node $V_k$.

The switching priority $$B_{v_k}^{i,j}$$

of the microservice instance is obtained based on the reliability level of the microservice instance.

Then, for each service, the path failing to satisfy the service latency requirement is identified, and an increment to the service reliability caused by the path is calculated. Only when the path $p^{i,k}$ can function normally, the primary path $p_{pri}^{i}$ fails, and other backup instances with higher switching priority than the microservice instance on $p^{i,k}$ also fail, will $p^{i,k}$ improve service reliability. Therefore, the increment to the service reliability caused by the path $p^{i,k}$ is as follows:

$$\nabla R_{S_i}(p^{i,k}) = R(p^{i,k}) = \prod_{p^{i,j,k} \neq p_{pri}^{i,j}}\left(\prod_{v_k \in \mu_{i,j}, \beta_{p^{i,k,j}}^{i,j} > \beta_{v_k}^{i,j}, v_k \notin p^{i,k}}(1 - R_{v_k}^{i,j})\right)$$

In the formula, $R(p^{i,k})$ represents the reliability of the path $p^{i,k}$ to function normally, $p^{i,k,j}$ and $$p_{pri}^{i,j}$$

respectively represent edge nodes where the j-th microservice of the service $S_i$ of the path $p^{i,k}$ and the primary path $$p_{pri}^{i}$$

is placed, and $V_{i,j}$ represents the set of edge nodes where the microservice $MS_{i,j}$ is placed.

Therefore, downgrading the switching priority of the microservice instances on the path $p^{i,k}$ can reduce the increment to the service reliability caused by the path failing to satisfy the latency requirement.

The service is linearly composed of microservices. The normal operation of the service requires all microservices to operate normally. Without considering latency, the service reliability calculation formula is as follows:

$$R(S_i) = \prod_{j \in MS^i} R(MS_{i,j})$$

In the formula, $R(S_i)$ represents the reliability of the service $S_i$, $R(MS_{i,j})$ represents the reliability of the microservice $MS_{i,j}$, and $MS^i$ represents the set of microservices of the service $S_i$. The calculation formula for $R(MS_{i,j})$ is as follows:

$$R(MS_{i,j}) = 1 - \prod(1 - R_{v_k}^{i,j}), j \in MS^i$$

Finally, the reliability increment of the path that fails to satisfy the latency requirement is subtracted from the service reliability, so as to obtain the actual service reliability. The simulated annealing method is adopted to downgrade the switching priority of the microservice instances until the SLA is satisfied. The calculation formula for actual service reliability is as follows:

$$R_i^{act} = R(S_i) - \sum_{p^{i,k} \in \overline{p^i}} \Delta R_{S_i}(p^{i,k})$$

In the formula, $\overline{p^i}$ represents a set of paths of the service $S_i$ that fail to satisfy the latency requirement.

7. For a service satisfying the SLA, the deployment cost of the microservice instances is reduced using a pruning algorithm.

Due to limited resources in edge computing environments, under the condition where the SLA is satisfied, unnecessary microservice instances need to be removed according to a pruning priority of the microservice instances until there are no unnecessary microservice instances, thereby reducing the deployment cost of microservice instances. The pruning priority, $\gamma_{v_k}^{i,j}$ of the microservice instances is as follows:

$$\gamma_{v_k}^{i,j} = \omega_1 UC_{v_k} c_{i,j} + \omega_2(1 - A_{v_k})$$

In the formula, $\omega_1$ represents the weight of objective function 1, $\omega_2$ represents the weight of objective function 2, $UC_{v_k}$ represents the unit computing resource cost of the edge node $V_k$, $c_{i,j}$ represents computing resources required for the microservice $MS_{i,j}$, and $A_{v_k}$ represents a 0-1 variable indicating whether a microservice instance is deployed on the edge node $V_k$.

8. The edge cloud service provider places the service on the primary instance for processing, thereby providing services to the user.

The primary path is responsible for traffic forwarding and service processing, providing services for the user.

In summary, the redundant backup deployment solution for the microservice applicable to edge computing environments according to the present disclosure effectively reduces the deployment cost of microservice instances and minimizes the number of active edge nodes while ensuring the SLA by rationally deploying microservice instances and selecting primary instances. The implementation of this technology can be widely applied to service scenarios with extremely strict latency and reliability requirements, such as the Internet of Things and autonomous driving. It effectively reduces resource consumption in edge computing environments and promotes the practical application of edge computing in extreme service scenarios, demonstrating significant social and economic value.

What is claimed is:

1. A redundant backup deployment method for microservice instances in edge computing environments, comprising following steps:

step 1, sending, by a user, a service request for a service $S_i$, accessing a corresponding edge cloud, and signing a service level agreement (SLA) with an edge cloud service provider; wherein the service $S_i$ is linearly composed of microservices, and a j-th microservice of the service $S_i$ is defined by a tuple $MS_{i,j}=(S_i, R_i, L_i, N_i, r_{i,j}, c_{i,j}, b_{i,j})$, wherein the service $S_i$ represents the service to which the microservice belongs, $R_i$, $L_i$, $N_i$ respectively represent a reliability requirement and a latency requirement of the service to which the microservice belongs and a number of the microservices comprised in the service $S_i$, $r_{i,j}$ represents software reliability of the microservice, and $c_{i,j}$ and $b_{i,j}$ represent computing resources and bandwidth resources required for the microservice, respectively;

step 2, acquiring, by the edge cloud service provider, edge computing network topology information, and abstracting the edge computing network topology information into an undirected network graph G(V,E); wherein an edge computing environment is modeled as the undirected graph G(V,E) by using a network modeling method; wherein $V=(V_1, V_2, \ldots, V_n)$ represents a set consisting of n edge nodes, and E={$e_{i,j}$|i, j∈n, i≠j} represents a set of links in the edge environment, wherein $e_{i,j}$ represents a link between edge nodes $V_i$ and $V_j$; the edge node $V_i$ consists of a triple <$R_{v_i}$, $C_{v_i}$, $UC_{v_i}$>, wherein $R_{v_i}$, $C_{v_i}$, and $UC_{v_i}$ respectively represent hardware reliability, a contained computing resource, and a unit computing resource cost of the edge node $V_i$; the link $e_{i,j}$ consists of a triple <$L_{e_{i,j}}$, $B_{e_{i,j}}$, $UB_{e_{i,j}}$>, wherein $L_{e_{i,j}}$, $B_{e_{i,j}}$, and $UB_{e_{i,j}}$ respectively represent a transmission latency, a contained bandwidth resource, and a unit bandwidth resource cost of the link $e_{i,j}$;

step 3, establishing a multi-objective optimization mathematical model that considers a plurality of service deployment constraints by combining service information and the edge computing network topology information; comprising minimizing a deployment cost of the service $S_i$ while minimizing a number of active edge nodes, and specific objective functions are as follows:

3.1 objective function 1: minimizing the deployment cost of the service $S_i$, wherein the service $S_i$ is composed of the microservices; a total cost of deploying the microservices corresponds to the deployment cost of the service $S_i$ and the deployment cost of the service $S_i$ is as follows:

$$\text{cost}(S_i) = \sum_{j=1}^{N_i}\sum_{k=1}^{n} UC_{v_k} c_{i,j} x_{v_k}^{i,j} + \sum_{j=1}^{N_i}\sum_{e_{c,d}\in L} UB_{e_{c,b}} b_{i,j} z_{e_{c,d}}^{i,j}$$

wherein $$x_{v_k}^{i,j}$$

represents a 0-1 variable indicating whether a microservice $MS_{i,j}$ is placed on an edge node $V_k$, and $$z_{e_{c,d}}^{i,j}$$

represents a 0-1 variable indicating whether a primary instance of the microservice $MS_{i,j}$ passes through a link $e_{c,d}$; the objective function 1 is as follows:

$$f_1 = \min\left(\sum_{i\in S}\text{cost}(S_i)\right)$$

wherein S represents a set of all services; and 3.2 objective function 2: minimizing the number of active edge nodes, wherein the objective function 2 is as follows:

$$f_2 = \min\sum_{k=1}^{n} A_{v_k}$$

wherein $$A_{V_k}$$

represents a 0-1 variable; if $$A_{v_k}$$

is 1, it indicates that a microservice instance is deployed on the edge node $V_k$, and if $$A_{v_k}$$

is 0, it indicates that no microservice instance is deployed; wherein in the step 3.1, the deployment cost of the service $S_i$ needs to be normalized and is expressed as follows:

normalization of the deployment cost of the service $S_i$ is defined as follows:

$$f_1 = \frac{1}{|s|\cdot\theta_{cost(S)}}\min\left(\sum_{i\in S}\text{cost}(S_i)\right)$$

wherein |S| represents a number of services, and $\theta_{cost(S)}$ represents a value of a maximum deployment cost among the services S; and in the step 3.2, the number of active edge nodes needs to be normalized and is specifically expressed as follows:

normalization of the number of active edge nodes is defined as follows:

$$f_2 = \frac{1}{|n|}\min\sum_{k=1}^{n} A_{v_k}$$

wherein |n| represents a number of edge nodes in the edge environment;

wherein in the steps 3.1 and 3.2, the plurality of service constraints need to be considered to implement the multi-objective service deployment optimization model, and the constraints are as follows:

1): integrity of service $$\sum_{k=1}^{n} x_{v_k}^{i,j} \geq 1, \forall i \in S, j \in MS^i$$

wherein $MS^i$ represents a set of microservices of the service $S_i$; this constraint ensures that each microservice of the service $S_i$ has at least one microservice instance, thereby ensuring that the service $S_i$ is capable of operating;

2): limitation of primary instance $$\sum_{k=1}^{n} y_{V_k}^{i,j} = 1, \forall i \in S_i, j \in MS^i$$

wherein $$y_{V_k}^{i,j}$$

represents a 0-1 variable indicating whether the j-th microservice of the service $S_i$ places the primary instance at the edge node $V_k$, and a primary path formed by the primary instances of the service $S_i$ is responsible for traffic forwarding and service provision; when the primary instance fails, a switch will be made to a backup instance according to the switching priority of the microservice instances; this constraint ensures that each microservice has one primary instance, thereby ensuring that the primary path is capable of providing services;

3): assurance of service reliability a propagation latency $L^{i,k}$ of a k-th path $p^{i,k}$ of the service $S_i$ is calculated as follows:

$$L^{i,k} = \sum_{e_{c,b} \in p^{i,k}} L_{e_{c,d}}, p^{i,k} \in p^i$$

wherein $P^i$ represents a path combination formed by all microservice instances of the service $S_i$;

then, a path failing to satisfy the latency requirement is identified, and an increment to the service reliability caused by the path is calculated to obtain actual service reliability:

$$R_i^{act} = R(S_i) - \sum_{p^{i,k} \in p^i} \Delta R_{S_i}(p^{i,k})$$

wherein $R(S_i)$ represents the service reliability without considering the latency, $$\overline{p^i}$$

represents a set of paths failing to satisfy the latency requirement, and $\Delta R_{S_i}(p^{i,k})$ represents the increment to the service reliability caused by the path $p^{i,k}$;

the actual service reliability $$R_i^{act}$$

needs to satisfy the reliability requirement of the service $S_i$:

$$R_i^{act} \geq R_i$$

4): limitation of capacity $$\sum_{i \in S} \sum_{j \in MS^i} c^{i,j} x_{v_k}^{i,j} \leq C_{v_k}, \forall v_k \in V$$

$$\sum_{i \in S} \sum_{j \in MS^i} b^{i,j} z_{e_{c,d}}^{i,j} \leq B_{e_{c,d}}, \forall e_{c,d} \in E$$

wherein constraint ① ensures that total computing resources required for the microservice instances deployed on the edge node do not exceed computing resources available in the edge node, and constraint ② ensures that total bandwidth resources occupied by the microservice instances on the link do not exceed bandwidth resources of the link;

step 4, performing, by the edge cloud service provider, redundant backup deployment of the service $S_i$ based on the service information, the edge computing network topology information, and the multi-objective optimization mathematical model to satisfy the SLA, wherein Transformer-based deep reinforcement learning (T-DRL) is used to acquire redundant backup deployment of microservice instances and selection of a primary instance; specifically as follows:

4.1 an encoder uses a linear layer to embed edge computing environment information and the service information into a high-dimensional space separately to obtain initial embedding information, specifically as follows:

$$x_{V_k}^{(0)} = W_0[R_{v_k}, C_{v_k}, UC_{v_k}] + b_0$$

$$y_{e_{c,d}}^{(0)} = W_0[L_{e_{c,d}}, B_{e_{c,d}}, UB_{e_{c,d}}] + b_0$$

$$z_{i,j}^{(0)} = W_0[S_i, R_i, L_i, N_i, r_{i,j}, c_{i,j}, b_{i,j}] + b_0$$

wherein $$x_{v_k}^{(0)}$$

represents embedding of an edge node $v_k$ at layer 0, $$y_{e_{c,d}}^{(0)}$$

represents embedding of a link $e_{c,d}$ at the layer 0, $$z_{i,j}^{(0)}$$

represents embedding of a microservice $MS_{i,j}$ at the layer 0, $W_0$ and $b_0$ represent linearly varying parameters, and a [ . . . , . . . ] operation is used to concatenate information of a same dimension together;

4.2 the obtained initial embedding information $$x_{v_k}^{(0)}, y_{e_{c,d}}^{(0)}, \text{ and } z_{i,j}^{(0)}$$

is input into the encoder and processed through L identical layers to obtain final embedding information $x^{(L)}$, $y^{(L)}$, and $z^{(L)}$, wherein each layer comprises a multi-head attention layer, a residual connection layer, a normalization layer, and a feedforward network layer; edge node information of the edge computing environment is $$x^{(L)} = \text{mean}\left(x_{V_1}^{(L)}, x_{V_2}^{(L)}, \dots, x_{V_k}^{(L)}\right),$$

link information is $$y^{(L)} = \text{mean}\left(y_{e_{1,2}}^{(L)}, y_{e_{1,3}}^{(L)}, \dots, y_{e_{c,d}}^{(L)}\right),$$

and the service information is $$z^{(L)} = \text{mean}\left(z_{1,1}^{(L)}, z_{1,2}^{(L)}, \dots, z_{i,j}^{(L)}\right);$$

finally, all embedding information is concatenated through the linear layer to obtain global information $I^{(L)}$;

$$I^{(L)} = W_0[x^{(L)}, y^{(L)}, z^{(L)}] + b_0$$

4.3 a K value for K-fault tolerance deployment of the service $S_i$ is determined without considering the latency, and the K value of the service $S_i$ is calculated as follows:

$$\left[1 - \left(1 - (r_{i,j})_{min}(r_{v_k})_{min}\right)^k\right]^{N_i} \geq R_i$$

$$K \geq \frac{\log\left(1 - R_i^{\frac{1}{N_i}}\right)}{\log\left(1 - (r_{i,j})_{min}(r_{v_k})_{min}\right)}$$

wherein $(r^{i,j})_{min}$ represents minimum software reliability of the microservices composing the service $S_i$, and $$\left(r_{v_k}\right)_{min}$$

represents minimum hardware reliability of the edge nodes in the edge environment;

4.4 a decoding process is to model a redundant backup deployment problem as a Markov decision process, wherein each microservice is considered as an agent, the edge environment and the service information serve as a state set, and an action set selects an edge node for each microservice to deploy a microservice instance; and a decoder uses context information from the encoder, with the agent serving as a query vector and the edge node serving as a key vector and a value vector, and combines a mask rule to generate a probability vector for deploying each microservice instance at the edge node; the agent selects a next edge node to deploy a microservice instance at each time step based on a policy of a DRL model until the K-fault tolerance redundant backup deployment of the microservice is completed;

4.5 when the K-fault tolerance deployment of the microservice is completed, the decoder uses the context information of the encoder and a condition of the K-fault tolerance deployment, with the agent serving as the query vector and the edge node serving as the key vector and the value vector, and combines the mask rule to generate a probability vector for each microservice instance to serve as the primary instance; the agent selects the primary instance at each time step based on the policy of the DRL model and constructs a primary path for the service $S_i$; and 4.6 neural network parameters $\theta$ are trained using a policy gradient method to update the policy of the DRL model, optimize a policy network, and maximize an expected cumulative reward, wherein the policy gradient method comprises two networks: the policy network and a baseline network; the policy network selects an action from the probability vector by using a sampling method, and the baseline network selects an action from the probability vector by using a greedy policy; the neural network parameters are optimized by calculating a gradient of a loss function as follows:

$$\nabla_\theta L(\theta) = \frac{1}{B} \sum_{i=1}^{B}\left[\left(R(\pi_i) - R(\pi^{BL})\right)\nabla_\theta \log p_\theta(\pi_i)\right]$$

wherein B represents a batch size, $R(\pi_i)$ represents a reward under the policy network, and $R(\pi^{BL})$ represents a reward under the baseline network;

step 5, traversing the redundant backup deployment and a selection result of the primary instance to check whether the SLA is satisfied; if not satisfied, performing step 6; if satisfied, performing step 7;

step 6, for a service failing to satisfy the SLA, identifying a path thereof that fails to satisfy latency, and downgrading a switching priority of microservice instances on the path using a simulated annealing method until the SLA is satisfied; and step 7, under a condition where the SLA is satisfied, removing, based on a removal priority of the microservice instances, the microservice instances using a pruning algorithm until no more microservice instances can be removed.

2. The redundant backup deployment method for microservice instances in edge computing environments according to claim 1, wherein in the step 4.6, during each training batch, a paired t-test is performed on the two networks, and if significant at a 95% confidence level, parameters of the policy network are used to replace parameters of the baseline network.

3. The redundant backup deployment method for microservice instances in edge computing environments according to claim 1, wherein in the step 5, traversing the redundant backup deployment and the selection result of the primary instance to check whether the SLA is satisfied is specifically as follows:

first, calculating reliability of a microservice instance for each microservice, with the reliability of the instance of the microservice $MS_{i,j}$ deployed at the edge node $V_k$ being calculated as follows:

$$R_{v_k}^{i,j} = r_{i,j} R_{v_k} x_{v_k}^{i,j}$$

wherein $$x_{v_k}^{i,j}$$

represents 0-1 variable, and $$R_{V_k}$$

represents the hardware reliability of the edge node $v_k$; for each microservice, a switching priority $$\beta_{v_k}^{i,j}$$

of the microservice instance is obtained based on the reliability of the microservice instance;

then, identifying a path that fails to satisfy the service latency requirement for the service $S_i$, and calculating an increment to the service reliability caused by the path, an increment to the service reliability caused by path $p^{i,k}$ being as follows:

$$\Delta R_{S_i}(p^{i,k}) = R(p^{i,k}) \prod_{p^{i,k,j} \neq p_{pri}^{i,j}} \left( \prod_{v_k \in \mu_{i,j}, \beta_{p^{i,k,j}}^{i,j} > \beta_{v_k}^{i,j}, v_k \notin p^{i,k}} (1 - R_{v_k}^{i,j}) \right)$$

wherein $R(p^{i,k})$ represents the reliability of the path $p^{i,k}$, $p^{i,k,j}$ and $$P_{pri}^{i,j}$$

respectively represent edge nodes where the j-th microservice of the service $S_i$ of the path $p^{i,k}$ and primary path $$p_{pri}^i$$

is placed, and $V_{i,j}$ represents a set of edge nodes where the microservice $MS_{i,j}$ is placed; and finally, subtracting the reliability increment of the path that fails to satisfy the latency requirement from the service reliability to obtain actual service reliability, and checking whether the actual service reliability satisfies the SLA.

4. The redundant backup deployment method for microservice instances in edge computing environments according to claim 1, wherein in the step 7, the pruning algorithm is as follows:

under a condition where the SLA is satisfied, unnecessary microservice instances need to be removed according to a pruning priority of the microservice instances, the pruning priority $$\gamma_{v_k}^{i,j}$$

of the microservice instances being as follows:

$$\gamma_{V_k}^{i,j} = \omega_1 UC_{V_k} c_{i,j} + \omega_2 (1 - A_{V_k})$$

wherein $\omega_1$ represents a weight of objective function 1, $\omega_2$ represents a weight of objective function 2, and $UC_{v_k}$ represents the unit computing resource cost of the edge node $V_k$.

* * * * *